US011089281B2

(12) United States Patent
Begeja et al.

(10) Patent No.: US 11,089,281 B2
(45) Date of Patent: Aug. 10, 2021

(54) VOLUMETRIC VIDEO CREATION FROM USER-GENERATED CONTENT

(71) Applicant: AT&T Intellectual Property I, L.P., Atlanta, GA (US)

(72) Inventors: Lee Begeja, Gillette, NJ (US); Eric Zavesky, Austin, TX (US); Behzad Shahraray, Holmdel, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/201,586

(22) Filed: Nov. 27, 2018

(65) Prior Publication Data

US 2020/0169718 A1 May 28, 2020

(51) Int. Cl.
| | |
|---|---|
| H04N 13/156 | (2018.01) |
| H04N 13/117 | (2018.01) |
| G06T 17/00 | (2006.01) |
| G06T 15/04 | (2011.01) |
| H04N 13/167 | (2018.01) |
| G06T 7/70 | (2017.01) |
| G06K 9/00 | (2006.01) |

(Continued)

(52) U.S. Cl.
CPC ....... *H04N 13/156* (2018.05); *G06K 9/00744* (2013.01); *G06K 9/6202* (2013.01); *G06T 15/04* (2013.01); *G06T 17/00* (2013.01); *H04N 13/117* (2018.05); *H04N 13/167* (2018.05); *G06K 2009/6213* (2013.01); *G06K 2209/27* (2013.01); *G06T 7/70* (2017.01); *G06T 2207/10016* (2013.01); *H04N 5/23222* (2013.01)

(58) Field of Classification Search
CPC .. H04N 13/156; H04N 13/167; H04N 13/117; H04N 5/23222; G06K 9/00744; G06K 9/6202; G06K 2009/6213; G06K 2209/27; G06T 15/04; G06T 17/00; G06T 7/70; G06T 2207/10016
USPC .......................................................... 348/139
See application file for complete search history.

(56) References Cited

U.S. PATENT DOCUMENTS

| | | | |
|---|---|---|---|
| 4,758,892 A | 7/1988 | Bloomfield | |
| 6,556,196 B1 * | 4/2003 | Blanz ................. | G06K 9/00275 345/419 |
| 7,660,510 B2 | 2/2010 | Kawahara et al. | |

(Continued)

FOREIGN PATENT DOCUMENTS

WO 2015115720 A1 8/2015

OTHER PUBLICATIONS

Content Based 3-D Model Retreival A Survey by Yang Lin Zhang, IEEE, Nov. 2007 (Year: 2007).*

*Primary Examiner* — Nathan J Flynn
*Assistant Examiner* — Caroline Somera

(57) ABSTRACT

A processing system having at least one processor may obtain at least a first source video from a first endpoint device and a second source video from a second endpoint device, where each of the first source video and the second source video is a two-dimensional video, determine that the first source video and the second source video share at least one feature that is the same for both the first source video and the second source video, and generate a volumetric video from the first source video and the second source video, where the volumetric video comprises a photogrammetric combination of the first source video and the second source video.

20 Claims, 3 Drawing Sheets

(51) Int. Cl.
*G06K 9/62* (2006.01)
*H04N 5/232* (2006.01)

(56) References Cited

U.S. PATENT DOCUMENTS

| | | | |
|---|---|---|---|
| 8,964,008 B2 | 2/2015 | Bathiche | |
| 9,124,847 B2 | 9/2015 | Moote et al. | |
| 9,124,863 B2 | 9/2015 | Shin et al. | |
| 9,424,461 B1* | 8/2016 | Yuan | G06K 9/00201 |
| 9,544,629 B2 | 1/2017 | Khare et al. | |
| 10,015,478 B1* | 7/2018 | Rabin | G06K 9/741 |
| 10,033,992 B1* | 7/2018 | McGowan | H04N 13/361 |
| 10,715,793 B1* | 7/2020 | Rabin | G06T 7/50 |
| 2003/0123713 A1* | 7/2003 | Geng | G06K 9/00288 |
| | | | 382/118 |
| 2010/0189342 A1* | 7/2010 | Parr | G06K 9/00275 |
| | | | 382/154 |
| 2011/0255746 A1* | 10/2011 | Berkovich | G06K 9/00214 |
| | | | 382/103 |
| 2013/0004060 A1* | 1/2013 | Bell | G01S 17/89 |
| | | | 382/154 |
| 2013/0141530 A1* | 6/2013 | Zavesky | G06T 19/20 |
| | | | 348/43 |
| 2013/0287294 A1* | 10/2013 | Ye | G06T 15/04 |
| | | | 382/154 |
| 2014/0043436 A1* | 2/2014 | Bell | H04N 13/156 |
| | | | 348/46 |
| 2014/0130069 A1* | 5/2014 | Khare | H04N 7/17318 |
| | | | 725/8 |
| 2015/0071614 A1 | 3/2015 | Hurley et al. | |
| 2017/0186241 A1* | 6/2017 | Zavesky | H04N 21/4394 |
| 2017/0193318 A1* | 7/2017 | Tumanov | G06T 7/11 |
| 2017/0316606 A1* | 11/2017 | Khalid | G06T 17/00 |
| 2018/0189600 A1* | 7/2018 | Astrom | G06K 9/6202 |
| 2018/0270518 A1 | 9/2018 | Feldman et al. | |
| 2018/0316948 A1 | 11/2018 | Todd | |
| 2019/0251744 A1* | 8/2019 | Flagg | G06T 17/10 |

* cited by examiner

VOLUMETRIC VIDEO CREATION FROM USER-GENERATED CONTENT

The present disclosure relates generally to visual communication sessions, and more particularly to methods, computer-readable media, and devices for generating a volumetric video from two-dimensional source videos.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
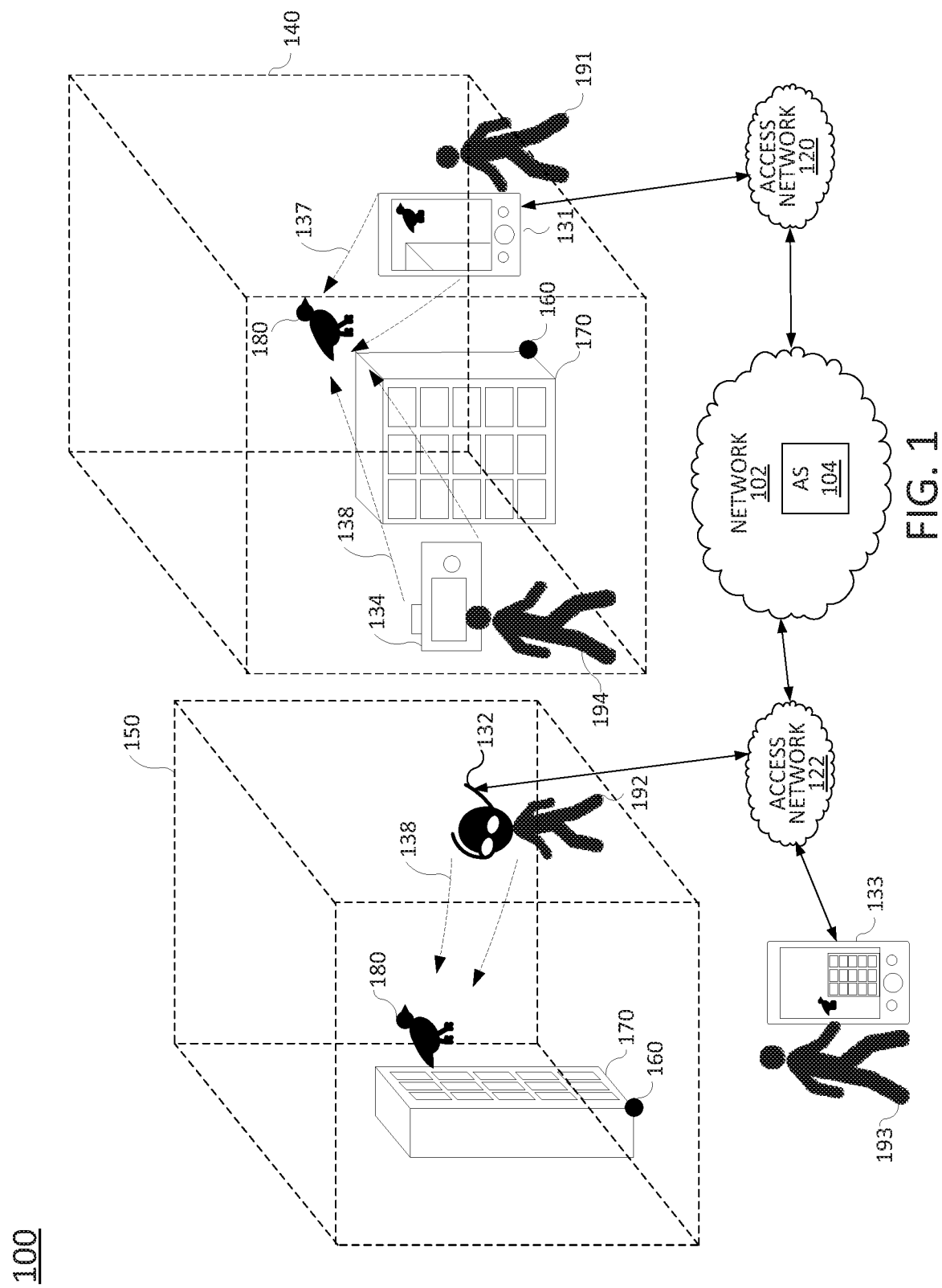
FIG. 1 illustrates an example network related to the present disclosure.

In one example, the present disclosure describes a method, computer-readable medium, and device for generating a volumetric video from two-dimensional source videos. For instance, in one example, a method may include a processing system having at least one processor obtaining at least a first source video from a first endpoint device and a second source video from a second endpoint device, where each of the first source video and the second source video is a two-dimensional video, determining that the first source video and the second source video share at least one feature that is the same for both the first source video and the second source video, and generating a volumetric video from the first source video and the second source video, where the volumetric video comprises a photogrammetric combination of the first source video and the second source video.

In particular, examples of the present disclosure include discovery of two-dimensional (2D) source videos (e.g., user generated content (UGC)), match detection between the 2D source videos, composition of 2D video imagery (and audio) into coherent, synchronized volumetric videos, and consumption options for experiencing the volumetric videos that are created. An example of the operations of the present disclosure may proceed as follows. Multiple users may capture 2D source videos which may contain imagery of a same location and/or a same object or set of objects, e.g., a large portable art exhibit. In one example, the source videos may be captured via cameras of respective endpoint devices of the different users (e.g., mobile endpoint devices, such as smartphones, augmented reality glasses or headsets, digital cameras, web-cameras, home-based or business-based security cameras, remote controlled drones, and so forth). In accordance with the present disclosure, 2D user-generated source videos may comprise analog video, e.g., 35 mm video reels, digitized 35 mm, digital videos, e.g., H.264 (Advanced Video Coding (AVC)), H.260 (High Efficiency Video Coding (HEVC)), Moving Picture Expert Group (MPEG) .mpeg files, .mov files, .mp4 files, 0.3gp files, .f4f files, .m3u8 files, and so forth. Each of the source videos may be historic (e.g., recorded and stored in one or more machine-readable formats) or may be a video stream from a video capture device. In one example, the source videos may be captured at the same time, or may comprise overlapping time frames. In another example, the source videos may be non-overlapping in time.

In one example, the 2D source videos may be determined to be related to each other, or matched, by virtue of sharing one or more features/factors. The matching may be based upon one or more user-provided criteria (e.g., features/factors), or may be based upon one or more default criteria, such as the two-dimensional source videos being of/from a same location, being recorded at a same time, including a same object (e.g., a landmark, a moveable object, etc.), and so forth. For instance, a user can specify certain criteria as providing a greater weight for matching, e.g., a same location may be required, while the user may be flexible as to the time of recording.

In one example, matching between the 2D source videos may be made directly via respective metadata of the 2D source videos (e.g., time tags, location tags, object tags, event tags, keywords, etc.). Alternatively, or in addition, a matching may be made by performing object detection/recognition processes (e.g., via machine learning-based object detection/recognition models) with respect to the 2D source video. In one example, a user associated with a 2D source video may be prompted to annotate one or more objects and/or the 2D source video with keywords, tags, or the like.

In any case, when source videos are determined to be matched, the visual information of the source videos may be collected into a single asset bundle and a volumetric video (VV) created therefrom using photogrammetric techniques. For example, the processing system may determine a position of at least one object of a 2D source video within a space of the volumetric video. The determining of the position may account for a location of a device recording the video, a bearing to an object, an estimated range to the object, a translation of a position of the device in a physical space to a position in a space of the volumetric video, and so forth. In one example, the processing system may calculate one or more adjustment factors to position the visual information of the 2D source video(s) correctly within the space of the volumetric video. For instance, the physical space may include reference points having known corresponding locations/positions in the space of the volumetric video from which the processing system may compute a transformation matrix to translate coordinates of objects in the source videos into corresponding coordinates in the space of the volumetric video.

The physical environment(s)/space(s) associated with the source video may be represented in the volumetric video as voxels having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next, e.g., as objects move through the physical environment(s), as lighting or other environmental conditions change, and so forth. Thus, information values for each voxel and for each frame may be calculated from the 2D source videos. In one example, the photogrammetric techniques may include a bundle adjustment based upon a plurality of visual features shared by the source videos. In addition, in one example, the bundle adjustment may be performed in accordance with a ranking of the plurality of visual features shared by the source videos. For instance, the present disclosure may perform coarse bundle adjustment based upon most salient visual features which are identified as being common to the source videos.

In one example, the generating of the volumetric video may include performing a time alignment of the source videos (e.g., when the source videos are from overlapping times). However, such a time alignment may be omitted when source videos are from different times (e.g., when at least one of the source videos is historic, or when the source videos are otherwise from different time periods). In one example, the bundle adjustment process may discover additional source videos (e.g., new source videos uploaded to a video sharing platform and/or historic videos from a digital library) to further augment the bundle of features and the resultant volumetric video. In one example, a coarse bundle of features may be refined for specific 3D positioning by visual matching, assessment, global positioning system (GPS) and/or other location metadata, and categorization tags (e.g., keywords).

In one example, the present disclosure may prioritize asset contributions to the volumetric video. For instance, higher quality source videos may be used as the basis for selecting anchor points to map positions in a physical space to positions within a space of the volumetric video. In addition, where multiple source videos capture the same objects, or portions of objects from a same perspective or from overlapping perspectives, the visual features taken from a higher quality source video may be given greater weighting in the bundle adjustment than visual features taken from lower quality source videos (where the quality may be indicated by a visual quality metric (VQM), such as a video encoding bitrate, a frame resolution, an automatically generated mean opinion score (MOS), and so forth. In other words, these may comprise the more "salient" features mentioned above. In one example, the present disclosure may determine a "focus" or root of volumetric video and give priority to that region for creating the volumetric video. For instance, a region having a highest frequency capture (e.g. the stage in a concert), may be given priority. For instance, for a real-time or near-real-time application, a processing system may not be able to render a volumetric video having all regions of the space of the volumetric video at a highest quality while maintaining the frame rate. However, rather than degrade the visual quality for the entire space, a higher quality may be maintained in the region of focus and a lesser quality provided for regions that are less of interest (to a user, or to a group of users experiencing the resultant volumetric video). Similarly, the present disclosure may reduce storage space for stored volumetric video containing differentiated visual qualities in accordance with the foregoing.

In one example, a lower visual quality (e.g., lower frame rate, lower resolution, e.g., larger voxel size, etc.) may be used in the creation of a volumetric video when one or more users are unfocused (e.g. walking, looking down, in dark area) instead of actively engaged in a capture process in an area. For instance, at a sporting event there may be times when there is no active play. As such, multiple source videos may be unfocused on the field of play and it may be determined from this collective information that a lower visual quality may be used when rendering the portion of the volumetric video corresponding to the time(s) when there is no action in the event.

In one example, a volumetric video may be generated by peer-peer assembly on endpoint devices (e.g., the endpoint devices capturing the source videos), may be generated at a network-based server (e.g., an edge server), or may be generated via a combination of endpoint devices and network-based servers. In one example, audio data from the source videos may also be combined and spatialized. In one example, motion from the source video (shaky, jumpy, etc.) can be captured to translate a 2D "experience" into a similar 3D experience for a presentation of the volumetric video, e.g. where a camera capturing a source video is mounted on a player versus a camera from the crowd at a sporting event. In one example, tags may be associated with detected and/or recognized objects and appended to the volumetric video as metadata that can be indexed and searched or displayed during playback/presentation.

In one example, 2D/planar objects from the source videos may be matched against a precomputed library of 2D objects to identify an object type. In one example, the matching may be a visual matching, e.g., using machine learning over low level and/or high level visual features of the object from the 2D source video. In an example where the object is tagged with a label, the matching may comprise performing a lookup of an object matching the label. In addition, in one example, the processing system may also store or have access to 3D object models which are associated with the 2D objects. For instance, a database may store 2D objects and corresponding "mapped" 3D object models.

In one example, the processing system may retrieve a corresponding 3D object model, and may texture map the visual content of the 2D object from the source video to the 3D object model to create an enhanced 3D object model. The texture mapping may include diffuse mapping, two-part mapping/intermediate mapping to an intermediate object, bump mapping, etc. For instance, visual information of the 2D object or "texture" (e.g., textels) may replace visual information in certain locations of the surface of the 3D object model. In one example, the visual information of the 2D object (from one or more 2D source videos) may be integrated with the visual information of the 3D object model at textel/texture boundaries derived from the visual information of the 2D object model. As such, the enhanced 3D object model may be considered as an estimate of what the 2D object would look like if full 3D information were available from the source video or elsewhere. The enhanced 3D object model may then be placed into the volumetric video at the location in the space of the volumetric video that is determined.

In one example, the present disclosure may suggest ideal or preferred viewing perspectives within a space of the volumetric video so that a viewing user can jump to these higher quality perspectives. In one example, consumption can be done just-in-time (e.g., as fast as the system may generate and disseminate the volumetric video) to render views from the most "ideal" perspective(s) that is/are determined. In one example, the present disclosure may retain privacy/source control rights associated with each source video to control whether and how the resultant volumetric video may be played back and/or experienced. In one example, users may be provided with an option to exclude or include certain source videos in the composition of a volumetric video. For instance, a user may specify to only compose a volumetric video from source videos from friends of the user, to exclude source videos from certain users, and so on. Similarly, in one example, a user may be provided with an option to turn on or off views/slices within a space of a volumetric video that have certain tags (e.g. hide all perspectives containing offensive content, content that is deemed unimportant by the user and can be excluded to save storage and/or network bandwidth, "premium" content that may have a cost associated therewith, or too high of cost associated therewith, etc.). In one example, privacy or digital rights management (DRM) restrictions for detail level may be imposed based on known (and propagated) user generated content/source videos. In addition, in one example, the present disclosure may fallback to those sources that do not have such restrictions.

In one example, the present disclosure may suggest to one or more users where they should move to "fill in the gaps." For instance, other users experiencing the volumetric video may provide feedback on areas of missing or poor visual quality, or suggestions may be automatically generated based on 3D volume analysis. To illustrate, multiple users may be at a sports stadium for an event, and a metric may be used to pick the right people in specific seats or sections of the stadium to provide source video(s). In one example, the present disclosure may provide incentives to users having endpoint devices associated with more expensive/ exclusive vantages from which additional source video(s) may be obtained. In one example, for regions that are lacking in content and/or content description, the present disclosure may solicit additional data from automated sources (e.g., environment cameras, automated drones, image or video libraries, etc). In this regard, it should be noted that the present disclosure may enhance a volumetric video created from user-generated source videos using other media, e.g., still images from the same time(s) or different time(s) as the source videos. For instance, the visual features from the still images may be included in a bundle of features for a bundle adjustment as described above. Thus, 2D video (or other content/images) from different time points may be used to fill in portions of the volumetric video (e.g., rendering a building with a historical façade) for a more complete volumetric video experience. In addition, in one example, a user may select additional source(s) and specify that these additional sources should be used to create the volumetric video (either to replace or supplement aspects from the source videos).

In one example, both visual quality metrics and viewpoint determinations are utilized to score regions of the space of the volumetric video and to identify regions to be enhanced. In one example, regions for improvement may be identified where visual quality is low, object(s) is/are missing or occluded, where the projection error (from homographic projection of one view into a 3D position) is too high, and so forth. In addition, optical characteristics of the capture device(s) (e.g., camera or video encoder features) may be considered in scoring the visual quality of a region of the volumetric video. In one example, unless a higher quality of data is available, original data of lower quality may be utilized.

A volumetric video created in accordance with the above may then be presented and/or experienced by one or more users. In addition, in one example, a 2D or 3D traversal, or "exploration" of the volumetric video may be captured, displayed, and/or exported to a new 2D or 3D video. Examples of the present disclosure therefore allow users to collaborate and mashup their 2D video content and/or to facilitate reuse of older partially overlapping user-generated source videos or other production materials to generate new volumetric video experiences. In particular, the wealth of existing 2D video (commercial or user-generated content (UGC)) can be leveraged to generate new volumetric videos combining the details and quality of capture of the individual components. Additionally, camera costs for volumetric video capture can be slowly absorbed through intelligent matching and composition of these 2D source videos. These and other aspects of the present disclosure are described in greater detail below in connection with the examples of FIGS. 1-3.

To further aid in understanding the present disclosure, FIG. 1 illustrates an example system 100 in which examples of the present disclosure for generating a volumetric video from two-dimensional source videos may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
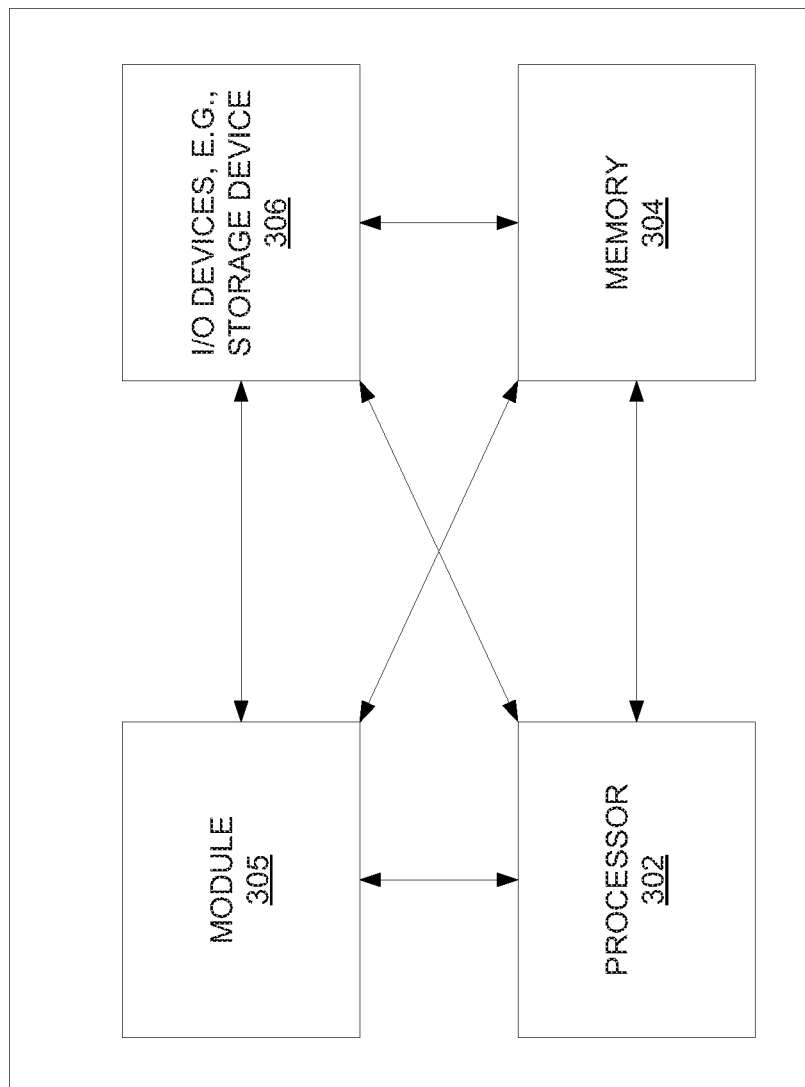
FIG. 3 illustrates a high level block diagram of a computing device specifically programmed to perform the steps, functions, blocks and/or operations described herein.

In accordance with the present disclosure, application server (AS) 104 may comprise a computing system or server, such as computing system 300 depicted in FIG. 3, and may be configured to provide one or more operations or functions for generating a volumetric video from two-dimensional source videos, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for generating a volumetric video from two-dimensional source videos, in accordance with the present disclosure. In one example, AS 104 may comprise a physical storage device (e.g., a database server), to store various types of information in support of systems for generating a volumetric video from two-dimensional source videos, in accordance with the present disclosure. For example, AS 104 may store a library of volumetric videos, a 2D video library, an image library, a plurality of 2D object detection/recognition models (e.g., machine learning-based image detection models), a catalog matching 2D objects to 3D object models, user preferences for source video matching, user preferences for prioritization of certain objects, topics, and/or regions of focus for rendering volumetric videos from 2D source videos, and so forth that may be processed by AS 104 in connection with generating a volumetric video from two-dimensional source videos. AS 104 may further store additional information such as a lexicon of topic models, e.g., machine learning-based models to identify topics and/or themes in 2D and/or volumetric video, and so forth. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to detect a type of 2D object in image and/or video content. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

The types of features from which 2D object detection/recognition models may be derived may include visual features from 2D video. For instance, the visual features may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a plurality of 2D video capture devices, e.g., user endpoint devices, such as devices 131 and 134. Similarly, access network 122 may be in communication with one or more devices, e.g., devices 132 and 133. Access networks 120 and 122 may transmit and receive communications between devices 131-134 and application server (AS) 104, other components of network 102, devices reachable via the Internet in general, and so forth. In one example, devices 131-134 may each comprise a mobile device, a cellular smart phone, a wearable computing device (e.g., smart glasses, augmented reality glasses, or a headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In one example, devices 131-134 may each comprise programs, logic or instructions for performing functions in connection with examples of the present disclosure for generating a volumetric video from two-dimensional source videos. For example, devices 131-134 may each comprise a computing system or device, such as computing system 300 depicted in FIG. 3, and may be configured to provide one or more operations or functions in connection with examples of the present disclosure for providing a communication session including video content of a physical environment that is modified in accordance with a visualization action for a physical object, as described herein.

In one example, the device 131 is associated with a first user 191 at a first physical environment 140. As illustrated in FIG. 1, the device 131 may comprise a smartphone with a camera to capture video (e.g., 2D video) from the physical environment 140. Similarly, the device 134 is associated with a second user 194 at the first physical environment 140. As illustrated in FIG. 1, the device 134 may comprise a digital camera to capture video (e.g., 2D video) from the physical environment 140.

In the present example, a volumetric video may be captured from a scene in a physical environment or a physical location 140. For instance, the devices 131 and 134 may be deployed with different perspectives (e.g., different orientations and viewpoints) of the physical environment 140. In the present example, the cameras 131 and 134 may capture 2D videos of a building 170 and a bird 180. In one example, the 2D videos may be processed by AS 104 as "source videos" as described herein. In particular, a volumetric video may be composited from the 2D videos obtained from the different devices 131 and 134. For instance, the devices 131 and 134 may feed the respective 2D videos to AS 104 in network 102 via access network 120.

In one example, AS 104 may determine match between the 2D source videos of devices 131 and 134 in accordance with one or more features that are shared by both the 2D source videos, such as time tags, location tags, object tags, event tags, keywords, etc. Alternatively, or in addition, a matching may be made by performing object detection/recognition processes with respect to either or both of the 2D source videos, and then confirming the presence of the same factors in both the 2D source videos. In one example, user 191 may be prompted by AS 104 and/or device 131 to annotate one or more objects and/or the respective 2D source video with keywords, tags, or the like. In one example, AS 104 may present to the user 191, via device 131, a ranked list of other 2D source videos comprising potential matches to the 2D source video of device 131 from which the user 191 may select one for further processing. For instance, results may be ranked by time (e.g., date and time, by the time of year/season, etc.), location, and/or environmental similarity (wet, snowy, clear, etc.) to the source video.

Alternatively, or in addition, AS 104 may present to the user 194, via device 134 or another user endpoint device associated with device 134, a ranked list of 2D source videos comprising potential matches to the 2D source video of device 134 from which the user 194 may select one for further processing. For instance, users 191 and 194 may participate in a social volumetric video composition service which allows users to share 2D source videos and obtain personalized volumetric videos generated from the respective user's own 2D source videos as well as other matching 2D source videos from one or more other users. Thus, in one example, users 191 and 194 may have different matching 2D source videos based upon respective user preferences, e.g., different criteria (factors/features) for matching. In addition, users 191 and 194 may select different source videos from ranked lists provided to users 191 and 194 as inputs for creating respective volumetric videos. Thus, it should be noted that different volumetric videos may be created for users 191 and 194. However, for illustrative purposes, the following describes an example where only a single volumetric video is created (e.g., in accordance with preferences of user 191).

In particular, AS 104 may compose a volumetric video from the 2D source videos from devices 131 and 134 using photogram metric techniques. For instance, the visual scene at the physical environment 140 may be represented in the volumetric video as voxels having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next as objects move through the physical environment 140, as lighting or other environmental conditions change, and so forth. Thus, AS 104 may calculate information values for each voxel and for each frame from the 2D videos sourced from the devices 131 and 134.

For illustrative purposes, the physical environment 140 may include a reference point 160 which may be associated with the building 170. For instance, the building 170 may comprise a known landmark, and reference point 160 may denote a corner of the building 170. Alternatively, or in addition, wireless beacons (not shown) in physical environment 140 having known locations may be used as reference points, such as Institute of Electrical and Electronics Engineers (IEEE) 802.15 based-beacons, IEEE 802.11 wireless routers and/or access points (AP), cellular base stations (or more particularly, the base station antennas), etc. For instance, devices 131 and 134 may determine their respective positions via observed time difference of arrival (OTDA), barycentric triangulation, or a similar technique with reference to one or more wireless beacons. In one example, devices 131 and 134 may communicate via access network 120 to provide respective 2D videos of the first physical environment 140 to AS 104. In the present example, the devices 131 and 134 may capture 2D videos that include images of a building 170 and a bird 180 (and which may also include sounds). The perspective 137 of the device 131 and the perspective 138 of device 134 are also illustrated in FIG. 1. In one example, the devices 131 and 134 may provide to AS 104 information from which the devices' perspective(s) may be quantified, such as: position information (e.g., GPS coordinates, coordinates and/or a position vector in relation to reference point 160, etc.), orientation information (e.g., azimuth and/or elevation information derived from a gyroscope and compass), and so forth.

In one example, the positions of objects, such as bird 180, within the space of the volumetric video may be determined based upon perspectives (positions and orientations) of the devices 131 and 134 (and more particular the perspectives of the cameras of such devices) in the physical environment 140. For example, the range (distance) from device 131 to the bird 180 may be determined from a focus of the device 131. For instance, zoom and focus settings may indicate the approximate distance at which the image of a field of view of a camera of device 131 is placed in focus. In one example, the zoom and focus settings may be manually set by the user 191. However, the device 131 may alternatively or additionally calculate the distance based upon the settings of the zoom and/or focus controls. In one example, the position of the bird 180 may be determined by using features of building 170 as reference points/key points. As such, the position of the bird 180 may be determined by estimating distances to the one or more key points of the building 170 in accordance with the visual information of the 2D source video. A similar process may be followed with respect to device 134. In addition, the perspective information (position and/or orientation), zoom and focus settings, range/distance, etc. associated with the 2D source videos from devices 131 and 134 may be included in a bundle of features for photogrammetric combination of the 2D source videos.

In one example, AS 104 may perform additional operations, such as detecting and recognizing an object in the 2D source videos and/or the volumetric video (e.g., bird 180) and replacing the object in the volumetric video with a 3D object model of the bird. For example, AS 104 may texture map visual features of the bird 180 from either or both of the 2D source videos from devices 131 and 134 to the 3D object model to produce a modified/enhanced 3D object model. AS 104 may then modify the volumetric video to include the enhanced 3D object model.

Once the volumetric video is created, the user 191, e.g., via device 131, may then obtain a presentation of the volumetric video from AS 104. For instance, AS 104 may create a 2D output video, e.g., a 2D projection/traversal of the 3D space of the volumetric video, and stream or otherwise transmit the output video to device 131. Alternatively, or in addition, the volumetric video may be provided to device 131, and device 131 may render the volumetric video in accordance with the 2D display capabilities of the device 131. For example, the user 191 may select one or more perspectives from within the space 140 of the volumetric video from which to render the 2D output video. For instance, a user interface of device 131 may enable the user 191 to move a viewpoint left/right, up/down, forward/backward, etc., to select coordinates or define a position with respect to a reference point (e.g., reference point 160), and so forth. It should be noted that the perspective(s) represented in the 2D output video may be entirely different from the perspective(s) from which the user 191 and user 194 captured the source videos via devices 131 and 134. In addition, in a server-based example, AS 104 may also store the 2D output video that is created. Similarly, AS 104 may provide the volumetric video or a 2D projection/traversal of the 3D space of the volumetric video to user 194 via device 134 or another device associated with device 134 (e.g., an endpoint device (not shown) for controlling the camera 134).

In one example, AS 104 may make the volumetric video and/or 2D output video available to other users (e.g., users 192 and 193). For example, as illustrated in FIG. 1, the device 132 may comprise a wearable computing device (e.g., a VR headset) and may present the space 150 of the volumetric video for user 192. In one example, device 132 may communicate via access network 122 to request the volumetric video, to receive the volumetric video and/or to receive at least a portion of the volumetric video to be used in rendering a portion of the space 150 that is currently within the perspective/view of the user 192, to provide position and orientation information of a view of the user 192 to AS 104 to determine which portion of the volumetric video to provide, to provide commands to start, stop, pause, resume, etc., (e.g., in an example where the volumetric video is streamed from AS 104), and so forth.

To illustrate, user 192 may set a perspective from which to experience the visual contents of the volumetric video. For instance, a user interface of device 132 may provide for the user 192 to move a viewpoint left/right, up/down, forward/backward, etc., to select coordinates or define a position with respect to a reference point (e.g., reference point 160 in space 150), and so forth. In one example, the user 192 may change perspectives by changing a location, e.g., by walking, changing a focus, e.g., by moving the user's head and/or eyes, changing a zoom level via a specific command and/or via eye adjustment, and so on. As illustrated in FIG. 1, user 192 may be viewing the bird 180 and building 170 from an entirely different perspective from which the user 191 and user 194 recorded the 2D source videos in the physical environment 140.

Similarly, a user 193 may obtain and experience the volumetric video, or the 2D output video, via the device 133. For instance, device 133 may comprise a mobile computing device, such as a smartphone, a tablet, or the like with a 2D display screen. For instance, AS 104 may provide the 2D output video to device 133. Alternatively, or in addition, AS 104 may provide the volumetric video to device 133, and device 133 may render the volumetric video in accordance with the 2D display capabilities of the device 133. For example, the user 193 may select one or more perspectives from within the space of (modified) volumetric video 150 from which to render the 2D output video.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within physical environment 140.

In one example, device 131 may capture additional objects in the 2D source video and may present to the user 191 options for removing or excluding such objects from the volumetric video to be created. For example, imagery of one or more individuals may be captured in the 2D source video who did not consent to have their images included in a volumetric video. As such, the user 191 will skip, omit, or block the images of such individuals. It should also be noted that in one example, other users who may generate their own 2D source videos at or near the same physical environment 140 may similarly benefit from the stored 3D content of the volumetric video including the building 170. In one example, new/modified volumetric videos may be stored in an efficient form by storing the building 170 as an object that may be re-used across different volumetric videos. Furthermore, other objects located at physical environment 140 may be present in a volumetric video but may be selectively included or excluded via user edits/modifications to the volumetric video as described herein. Thus, these and other modifications are all contemplated within the scope of the present disclosure.

Figure 2:
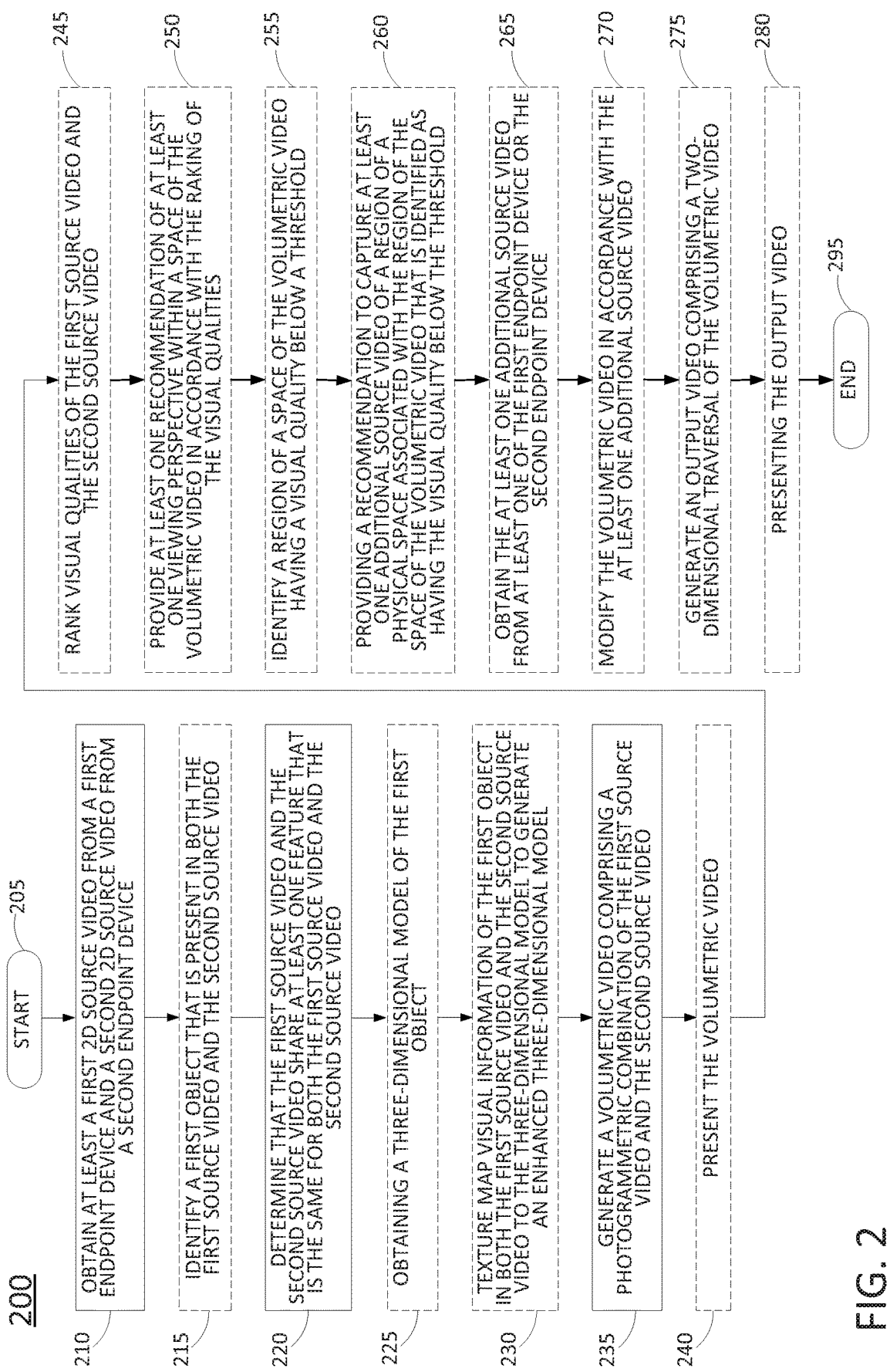
FIG. 2 illustrates a flowchart of an example method for generating a volumetric video from two-dimensional source videos.

FIG. 2 illustrates a flowchart of an example method 200 for generating a volumetric video from two-dimensional source videos, in accordance with the present disclosure. In one example, the method 200 is performed by a component of the system 100 of FIG. 1, such as by application server 104, device 131, device 134, and/or any one or more components thereof (e.g., a processor, or processors, performing operations stored in and loaded from a memory), or by application server 104, in conjunction with one or more other devices, such as devices 131-134, and so forth. In one example, the steps, functions, or operations of method 200 may be performed by a computing device or system 300, and/or processor 302 as described in connection with FIG. 3 below. For instance, the computing device or system 300 may represent any one or more components of application server 104, device 131, device 134, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains at least a first source video from a first endpoint device and a second source video from a second endpoint device, where each of the first source video and the second source video is a two-dimensional video. In various examples, the processing system may comprise the first endpoint device, the second endpoint device, an edge server, or any combination thereof.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 215, the processing system may identify a first object that is present in both the first source video and the second source video. In one example, the processing system may identify the first object because it is tagged in both source videos. In one example, the first object may be detected in the source videos in accordance with one or more 2D object detection/recognition models. The first object may be identified as a specific instance of an object type (e.g., a famous building, a specific person for which a 2D object detection/recognition model is available, etc.), or may be identified as an instance of an object type (e.g., "person," "building," "dog," "cat," etc., without identifying a specific person, building, dog, cat, etc.). Alternatively, or in addition, the processing system may perform visual matching, e.g., not necessarily detecting the first object, but detecting sufficient matching between low level and/or high level visual features, without identifying the actual object per se.

At step 220, the processing system determines that the first source video and the second source video share at least one feature that is the same for both of the first source video and the second source video. For instance, the at least one feature may comprise at least one of: location information, time information, an event tag, or a keyword. For instance, the location information may comprise GPS coordinates, a landmark identifying a location, a name of a place, or the like. An event tag may distinguish between different events at a same place but at different times, e.g., a concert at a stadium versus a sporting event on a different day. A keyword can include information regarding the presence of an object (e.g., a name of a known object, such as Statue of Liberty, Empire State Building, the aircraft carrier Intrepid, etc.). In one example, the at least one feature may comprise a presence of the first object. For example, the first object could be famous landmark, a street corner, a statute, a monument, etc., or a large portable art exhibit, such that the first source video generated at one location may still be paired with the second source video from an entirely different physical location and remain alignable based upon the same visual features.

At optional step 225, the processing system may obtain a three-dimensional model of the first object. In one example, the obtaining of the three-dimensional object model of the first object is in accordance with a catalog of two-dimensional objects and three-dimensional object models that are matched to the two-dimensional objects. In one example, the obtaining of the three-dimensional object model comprises matching the first object to one of the two-dimensional objects in the catalog, and obtaining, from the catalog, the three-dimensional object model that is matched to the two-dimensional object. In one example, the matching may be based upon keyword matching. For instance, users may tag objects (e.g., including the first object and possibly other objects) in the 2D source videos. These keywords, or tags, may be stored as metadata along with the 2D source videos, and may be referenced by the processing system at optional step 225. Alternatively, or in addition, in one example, the matching may be in accordance with a machine learning-based image detection model. For instance, the matching may be based upon low level or high-level visual features. Matching may also be enhanced or confirmed with audio features, movement features, etc.

At optional step 230, the processing system may texture map visual information of the first object in both the first source video and the second source video to the three-dimensional model of the first object to generate an enhanced three-dimensional model of the first object. The texture mapping may include diffuse mapping, two-part mapping/intermediate mapping to an intermediate object, bump mapping, etc. In one example, optional steps 225 and 230 may be performed when the first object is not a primary object with key points that are used for alignment, not a landmark object, etc.

At step 235, the processing system generates a volumetric video from the first source video and the second source video, wherein the volumetric video comprises a photogrammetric combination of the first source video and the second source video. In other words, the volumetric video may be generated by combining visual information of the first source video and the second source video using photogrammetric techniques. In one example, step 235 may include performing a bundle adjustment based upon a plurality of visual features shared by the first source video and the second source video. In addition, in one example, the bundle adjustment may be in accordance with a ranking of the plurality of visual features shared by the first source video and the second source video (e.g., coarse bundle adjustment based upon most salient visual features which are identified as being common to the source videos).

In one example, step 235 may include a spatial alignment where the processing system may detect key points (e.g., of at least one object, such as the first object) in both of the source videos, and calculate one or more adjustment factors to position the visual information of the source videos correctly within the space of the volumetric video. For instance, a physical space may include reference points having known corresponding locations/positions in the space of the volumetric video from which the processing system may compute a transformation matrix to translate coordinates of objects in the source videos into corresponding coordinates in the space of the volumetric video.

In one example, step 235 may also include performing a time alignment of the first source video and the second source video. For instance, time alignment may be performed when the first source video and the second source video are from overlapping times, but may not be performed when combining from different times/non-overlapping times (e.g., one of the source videos is historic, or when simply not captured in overlapping time periods). In one example, the time of a frame of one of the source videos may be determined in accordance with one or both of a start time and an end time of the source video, and the frame rate of the source video. In another example, each frame may be tagged with timing information. In addition, both source videos may similarly have a start time, end time and/or duration, frame rate, and similar information stored as metadata along with the visual information. As such, frames of the source videos having corresponding times may be paired. Alternatively, or in addition, alignment may be achieved with reference to one or more objects in motion. For instance, a ball may be bouncing and then come to rest in both of the source videos. Thus, the processing system may determine that a frame in the first source video and a frame in the second source video where the ball comes to rest are at a same time. However, it should again be noted that in some cases the intention of a user may be that the source videos are to be from different recording times. Thus, in one example, the user may be provided with a user interface to manually select a time alignment of the source videos.

In one example, step 235 may further include identifying, from the first source video and the second source video, a region of focus in a space of the volumetric video. In addition, in such an example, the photogrammetric combination of the first source video and the second source video may prioritize the region of focus. For example, a prioritization of the region of focus may utilize more key features from the region of focus for the photogrammetric combination than from other regions of the space of the volumetric video. The region of focus could be of a first user associated with the first source video, a second user associated with the second source video, or both, or may be a focus of one or more other users (e.g., users viewing the resultant volumetric video) relating to the same space of the volumetric video.

In one example, step 235 may further comprise including the enhanced three-dimensional model of the first object generated at optional step 235 within the space of the volumetric video. For instance, voxel data associated with the location of the first object within the space of the volumetric video may be changed to correspond to the enhanced three-dimensional object model of the first object. In one example, the voxel data may be changed across a plurality of frames in the volumetric video corresponding to times in which the three-dimensional object model of the first object is to be present in the volumetric video, e.g., in accordance with a time-alignment of the source videos.

At optional step 240, the processing system may present the volumetric video via at least one of: the first endpoint device or the second endpoint device. In one example, the processing system may present the volumetric video via a third endpoint device (e.g., an endpoint device not contributing a source video to the generation of the volumetric video). For instance, the third endpoint device may comprise a 3D/virtual reality headset for experiencing the volumetric video.

At optional step 245, the processing system may rank visual qualities of the first source video and the second source video. For instance, the visual qualities may be quantified by a visual quality metric (VQM), such as a video encoding bitrate, a frame resolution, an automatically generated mean opinion score (MOS), and so forth.

At optional step 250, the processing system may provide at least one recommendation of at least one viewing perspective within a space of the volumetric video in accordance with the ranking of the visual qualities. For instance, a perspective associated with a higher quality source video may be given a higher rank and may be recommended, or may be given a higher recommendation than perspectives associated with a source video having a lower visual quality.

At optional step 255, the processing system may identify a region of a space of the volumetric video having a visual quality below a threshold. The region may be identified as having a visual quality below the threshold where the region is composed of source video(s) identified as having lesser quality in accordance with optional step 245. Alternatively, or in addition, the region may be identified as having a visual quality below a threshold based upon incomplete visual information due to occlusions, shadowing, an insufficient number of endpoint devices capturing source video that includes the region, an insufficient number of perspectives of source videos focusing on the region, and so forth.

At optional step 260, the processing system may provide a recommendation to at least one of the first endpoint device or the second endpoint device to capture at least one additional source video of a region of a physical space associated with the region of the space of the volumetric video that is identified as having the visual quality below the threshold. For example, the recommendation may be provided to the first endpoint device, the second endpoint device, or both, but can also be provided to other endpoint devices that may be at the same location or at/near the same landmark object (e.g., large mobile object). In one example, the recommendation may include a recommendation of at least one of: a camera position in the physical space corresponding to a position in the space of the volumetric video, a camera orientation in the physical space corresponding to an orientation within the space of the volumetric video, a camera zoom level, or an object on which to focus.

At optional step 265, the processing system may obtain the at least one additional source video from at least one of the first endpoint device or the second endpoint device.

At optional step 270, the processing system may modify the volumetric video in accordance with the at least one additional source video. For instance, optional step 270 may include performing a photogram metric combination of the first source video, the second source video, and the at least one additional source video. For example, visual features of the at least one additional source video may be included in a bundle of features (along with visual features of the first source video and second source video) and a bundle adjustment process may be applied to the new bundle of features.

At optional step 275, the processing system may generate an output video comprising a two-dimensional traversal of the volumetric video. In one example, perspective(s) in the output video may be different from the view(s)/perspective(s) of the source videos and may comprise any number of changes in views/perspective, zooms, focuses, etc. In one example, the output video is generated in accordance with a selection by a user of at least one viewing perspective within the space of the volumetric video.

At optional step 280, the processing system may present the output video via at least one of: the first endpoint device, the second endpoint device, or a third endpoint device (e.g., an endpoint device not contributing a source video to the generation of the volumetric video).

Following step 235, or any of the optional steps 240-280, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 225-235 for additional objects, steps 250-270 to improve the volumetric video on an ongoing basis, and so forth. In another example, a feature of the source videos used for matching at step 220 may include a topic that is shared by both of the source videos. For instance, in such an example, the method 200 may be expanded to include topic (e.g., theme and/or concept) detection in the source videos. In one example, the source videos may be tagged with topics contained therein (manually or via application of topic detection algorithms, e.g., topic models/classifiers). In another example, identifying a region of focus at step 235 may be from a third user/viewing user of the volumetric video, who may not be the first user associated with the first source video or the second user associated with the second source video. For example, in real time or near-real-time volumetric video creation and consumption, a user's focus within the 3D space of the volumetric video at a current time may dictate the prioritization of how the volumetric video frames are generated in an immediately following time (e.g., as fast as system can process). In still another example, the method 200 may be expanded to include detecting a second object that is in the first source video, detecting that the second object is not in the second source video, and omitting the second object from the volumetric video at step 235 in response to detecting that the second object is in the first video but not in the second video. For example, these additional operations may be performed when the second object is an object that is identified as being personal to a first user associated with the first source video. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for generating a volumetric video from two-dimensional source videos, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for generating a volumetric video from two-dimensional source videos (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating a volumetric video from two-dimensional source videos (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, at least a first source video from a first endpoint device and a second source video from a second endpoint device, wherein each of the first source video and the second source video is a two-dimensional video;
determining, by the processing system, that the first source video and the second source video share at least one feature that is same for both the first source video and the second source video;
identifying, by the processing system, a first object that is present in both the first source video and the second source video;
matching, by the processing system, the first object to a two-dimensional object that is stored in a precomputed database of two-dimensional objects;
obtaining, by the processing system, a stored three-dimensional model that is identified, in the precomputed database of two-dimensional objects, as being matched to the two-dimensional object; and
generating, by the processing system, a volumetric video from the first source video and the second source video, wherein the volumetric video comprises a photogrammetric combination of the first source video and the second source video, and wherein the first object is replaced in the volumetric video with the three-dimensional model.

2. The method of claim 1, wherein the matching comprises matching at least one visual feature of a two-dimensional image of the first object from at least one of the first source video and the second source video to at least one visual feature of the two-dimensional object, wherein the at least one visual feature of the two-dimensional image of the first object and the at least one visual feature of the two-dimensional object comprise at least one of:
location information;
time information;
an event tag; or
a keyword.

3. The method of claim 2, wherein the at least one feature comprises:
a presence of the first object.

4. The method of claim 1, wherein the generating further comprises:
texture mapping, by the processing system, visual information of the first object in both the first source video and the second source video to the three-dimensional model to generate an enhanced three-dimensional model of the first object; and
storing the enhanced three-dimensional model of the first object for re-use in another volumetric video.

5. The method of claim 1, wherein the generating further comprises:
performing, by the processing system, a bundle adjustment based upon a plurality of visual features shared by the first source video and the second source video.

6. The method of claim 5, wherein the bundle adjustment is in accordance with a ranking of the plurality of visual features shared by the first source video and the second source video.

7. The method of claim 1, wherein the generating the volumetric video further comprises:
performing, by the processing system, a time alignment of the first source video and the second source video.

8. The method of claim 1, wherein the generating the volumetric video further comprises:
identifying, by the processing system, from the first source video and the second source video, a region of focus in a space of the volumetric video, wherein the photogram metric combination of the first source video and the second source video prioritizes the region of focus.

9. The method of claim 8, wherein a prioritization of the region of focus utilizes more key features from the region of focus for the photogrammetric combination than from other regions of the space of the volumetric video.

10. The method of claim 1, further comprising:
presenting, by the processing system, the volumetric video via at least one of:
the first endpoint device;
the second endpoint device; or
a third endpoint device.

11. The method of claim 1, further comprising:
generating, by the processing system, an output video comprising a two-dimensional traversal of the volumetric video, wherein a perspective of the output video is different from a perspective of the first source video and a perspective of the second source video.

12. The method of claim 11, wherein the output video is generated in accordance with a selection by a user of at least one viewing perspective within a space of the volumetric video.

13. The method of claim 11, further comprising:
presenting, by the processing system, the output video via at least one of:
the first endpoint device;
the second endpoint device; or
a third endpoint device.

14. The method of claim 1, further comprising:
ranking, by the processing system, visual qualities of the first source video and the second source video; and
providing, by the processing system, at least one recommendation of at least one viewing perspective within a space of the volumetric video in accordance with the ranking of the visual qualities.

15. The method of claim 1, further comprising:
identifying, by the processing system, a region of a space of the volumetric video having a visual quality below a threshold;
providing, by the processing system, a recommendation to at least one of the first endpoint device or the second endpoint device to capture at least one additional source video of a region of a physical space associated with the region of the space of the volumetric video that is identified as having the visual quality below the threshold;
obtaining, by the processing system, the at least one additional source video from at least one of the first endpoint device or the second endpoint device; and
modifying, by the processing system, the volumetric video in accordance with the at least one additional source video, wherein the modifying comprises a photogram metric combination of the first source video, the second source video, and the at least one additional source video.

16. The method of claim 15, wherein the recommendation to capture the at least one additional source video includes a recommendation of at least one of:
    a camera position in the physical space corresponding to a position in the space of the volumetric video;
    a camera orientation in the physical space corresponding to an orientation within the space of the volumetric video;
    a camera zoom level; or
    an object on which to focus.

17. The method of claim 1, wherein the processing system comprises at least one of:
    the first endpoint device; or
    the second endpoint device.

18. A non-transitory computer-readable medium storing instructions which, when executed by a processing system including at least one processor, cause the processing system to perform operations, the operations comprising:
    obtaining at least a first source video from a first endpoint device and a second source video from a second endpoint device, wherein each of the first source video and the second source video is a two-dimensional video;
    determining that the first source video and the second source video share at least one feature that is same for both the first source video and the second source video;
    identifying a first object that is present in both the first source video and the second source video;
    matching the first object to a two-dimensional object that is stored in a precomputed database of two-dimensional objects;
    obtaining a stored three-dimensional model that is identified, in the precomputed database of two-dimensional objects, as being matched to the two-dimensional object; and
    generating a volumetric video from the first source video and the second source video, wherein the volumetric video comprises a photogrammetric combination of the first source video and the second source video, and wherein the first object is replaced in the volumetric video with the three-dimensional model.

19. A device comprising:
    a processing system including at least one processor; and
    a computer-readable medium storing instructions which, when executed by the processing system, cause the processing system to perform operations, the operations comprising:
        obtaining at least a first source video from a first endpoint device and a second source video from a second endpoint device, wherein each of the first source video and the second source video is a two-dimensional video;
        determining that the first source video and the second source video share at least one feature that is same for both the first source video and the second source video;
        identifying a first object that is present in both the first source video and the second source video;
        matching the first object to a two-dimensional object that is stored in a precomputed database of two-dimensional objects;
        obtaining a stored three-dimensional model that is identified, in the precomputed database of two-dimensional objects, as being matched to the two-dimensional object; and
        generating a volumetric video from the first source video and the second source video, wherein the volumetric video comprises a photogrammetric combination of the first source video and the second source video, and wherein the first object is replaced in the volumetric video with the three-dimensional model.

20. The method of claim 2, wherein the first object is matched to the two-dimensional object by matching a label with which the first object is tagged to the two-dimensional object.

* * * * *